(12) United States Patent
Emaru et al.

(10) Patent No.: US 11,308,494 B2
(45) Date of Patent: Apr. 19, 2022

(54) TRANSACTION EXECUTION METHOD AND SYSTEM

(71) Applicant: HITACHI, LTD., Tokyo (JP)

(72) Inventors: Hironori Emaru, Tokyo (JP); Kei Fukuta, Tokyo (JP)

(73) Assignee: HITACHI, LTD., Tokyo (JP)

( * ) Notice: Subject to any disclaimer, the term of this patent is extended or adjusted under 35 U.S.C. 154(b) by 175 days.

(21) Appl. No.: 16/817,869

(22) Filed: Mar. 13, 2020

(65) Prior Publication Data

US 2021/0065180 A1 Mar. 4, 2021

(30) Foreign Application Priority Data

Aug. 30, 2019 (JP) .............................. JP2019-157597

(51) Int. Cl.
| | |
|---|---|
| *G06Q 20/40* | (2012.01) |
| *G06F 16/21* | (2019.01) |
| *G06N 3/12* | (2006.01) |
| *G06Q 20/20* | (2012.01) |
| *G06Q 40/02* | (2012.01) |
| *G06Q 40/00* | (2012.01) |
| *G06Q 20/38* | (2012.01) |
| *G06F 16/215* | (2019.01) |

(52) U.S. Cl.
CPC ......... *G06Q 20/401* (2013.01); *G06F 16/215* (2019.01); *G06Q 20/202* (2013.01); *G06Q 20/3825* (2013.01); *G06Q 20/3827* (2013.01); *G06Q 40/025* (2013.01); *G06Q 40/12* (2013.12); *G06N 3/126* (2013.01); *G06Q 2220/00* (2013.01)

(58) Field of Classification Search
None
See application file for complete search history.

(56) References Cited

U.S. PATENT DOCUMENTS

2008/0051122 A1* 2/2008 Fisher .................... G06Q 20/32
455/466

FOREIGN PATENT DOCUMENTS

WO 2015/148850 A1 10/2015

* cited by examiner

*Primary Examiner* — Paul Danneman
(74) *Attorney, Agent, or Firm* — Volpe Koenig

(57) ABSTRACT

A system for making a remittance between persons and making payments offline, and for securely being able to conduct these transactions is disclosed. A participant terminal stores verified TX information to which is added a verified TX object, which represents a transaction (TX) and has been verified by a verifier. Each participant terminal stores unverified TX information to which is added an unverified TX object, which represents a TX and has not been verified by a verifier. When a TX arises between a first participant and a second participant, the first participant terminal and the second participant terminal mutually retain the same unverified TX object group including the unverified TX object of that TX. When the first participant terminal is online, verification of the unverified TX object is requested, and, when the verification is successful, that object is added to the verified TX information as a verified TX object.

10 Claims, 9 Drawing Sheets

PUBLIC KEY TABLE
4000

| ID | PUBLIC KEY |
|---|---|
| 0001 | /f0+Nnr2b... |
| 0002 | 1rmpgp7Bz... |
| 0004 | BVdDPML+8... |
| : | : |

VERIFIED TX TABLE
5000

| SOURCE ID | DESTINATION ID | CURRENCY AMOUNT | TX TIME | SOURCE SIGNATURE | DESTINATION SIGNATURE | VERIFICATION TIME | VERIFIER SIGNATURE |
|---|---|---|---|---|---|---|---|
| 0101 | 8203 | 300 | 4/1/2019 10:50:00 | mQGiBDdav... | 1F1R0n0zK... | 4/2/2019 18:07:14 | 4U+tJ9E0a... |
| 4558 | 2935 | 1450 | 4/1/2019 10:51:05 | pjbjREAUk... | Euu1rmpgp... | 4/2/2019 18:07:16 | L+Q1REgAj... |
| 9102 | 9702 | 5 | 4/1/2019 10:55:40 | ls7GxlI0+... | 1F1R0n0zK... | 4/2/2019 18:07:30 | 8g2Bt3hVa... |
| .. | .. | .. | .. | .. | .. | .. | .. |
| 5110 | 5120 | 5130 | 5140 | 5150 | 5160 | 5170 | 5180 |

FIG. 6

UNVERIFIED TX TABLE
6000

| USER ID | SOURCE ID | DESTINATION ID | CURRENCY AMOUNT | TX TIME | SOURCE SIGNATURE | DESTINATION SIGNATURE | VERIFICATION TIME | VERIFIER SIGNATURE |
|---|---|---|---|---|---|---|---|---|
| 0101 | 0101 | 8203 | 300 | 4/1/2019 10:50:00 | mQGiBDdav... | 1F1R0n0zK... | 2019/4/2 18:07:14 | 4U+tJ9E0a... |
| 0101 | 4558 | 0101 | 1450 | 4/1/2019 10:51:05 | pjbjREAUk... | Euu1rmpgp... | | |
| 0101 | 0101 | 9102 | 605 | 4/1/2019 10:55:40 | ls7GxIl0+... | 1F1R0n0zK... | | |
| 4558 | 8754 | 4558 | 1450 | 4/1/2019 2:33:23 | 8uHBg6Ta... | WdF67Ng+... | 2019/4/2 18:07:16 | L+Q1REgAj... |
| 4558 | 4558 | 0101 | 1450 | 4/1/2019 10:51:05 | pjbjREAUk... | Euu1rmpgp... | | |
| 9102 | 3498 | 9102 | 55 | 4/1/2019 9:55:40 | iTreGF87... | OkL+43VVc... | 2019/4/2 18:07:30 | 8g2Bt3hVa... |
| 9102 | 9102 | 6702 | 5 | 4/1/2019 9:58:40 | xY11a+0UQ... | VbZ8a5bo9... | | |
| 9102 | 0101 | 9102 | 605 | 4/1/2019 10:55:40 | ls7GxIl0+... | 1F1R0n0zK... | | |

6105, 6110, 6120, 6130, 6140, 6150, 6160, 6170, 6180

6210A, 6210B, 6210C

TRANSACTION EXECUTION METHOD AND SYSTEM

CROSS-REFERENCE TO PRIOR APPLICATION

This application relates to and claims the benefit of priority from Japanese Patent Application number 2019-157597, filed on Aug. 30, 2019, the entire disclosure of which is incorporated herein by reference.

BACKGROUND

The present invention generally relates to the execution of offline transactions.

As an example of a transaction, there is the payment from a person to a store. As a technology related to the processing of offline payment, there is the technology disclosed in PTL 1. According to PTL 1, a user device acquires a balance certificate from an account system online. With an offline payment between a user device and a seller device, a balance certificate is sent from the user device to the seller device, and a withdrawal record is sent from the seller device to the user device. When the seller device goes offline, the withdrawal record is sent to an account system. That is, in PTL 1, the technology is based on the premise that both the user device and the seller device are online.

[PTL 1] WO2015/148850

SUMMARY

In certain countries and regions including developing countries, there is a high risk in carrying cash around due to the possibility of forgery and the risk of theft. While devices such as smartphones are also becoming popular in these countries and regions, generally speaking the communication network and the power network are weak, and there are many cases where the devices go offline unintentionally. Thus, in these countries and regions, it would be desirable to introduce a technology which enables safe payment offline. Nevertheless, because the technology of PTL 1 is based on the premise that both the user device and the seller device are online as described above, it is unsuitable for the foregoing countries and regions.

Moreover, in the countries and regions described above, in addition to making payment offline, it would be desirable to support the safe remittance between persons offline. Nevertheless, PTL 1 does not disclose or even suggest the remittance between persons offline.

At least one participant terminal among a plurality of participant terminals stores verified transaction information to which is added a verified transaction object, which represents a transaction and which is an object that has been verified by a verifier. Each of the plurality of participant terminals stores unverified transaction information to which is added an unverified transaction object, which represents a transaction and which is an object that has not been verified by a verifier. When a transaction arises between a first participant and a second participant, the first participant terminal and the second participant terminal mutually retain the same unverified transaction object group including the unverified transaction object of that transaction. When the first participant terminal is online, verification of the unverified transaction object is requested, and, when the verification is successful, that object is added to the verified transaction information as a verified transaction object.

It is possible to simultaneously pursue the convenience of being able to make remittance between persons in addition to making payment offline, and the high security of being able to conduct these transactions safely.

BRIEF DESCRIPTION OF DRAWINGS

FIG. 5 is a configuration diagram of the verified transaction table in the first embodiment of the present invention.

FIG. 6 is a configuration diagram of the unverified transaction table list in the first embodiment of the present invention.

DESCRIPTION OF EMBODIMENTS

Figure 1:
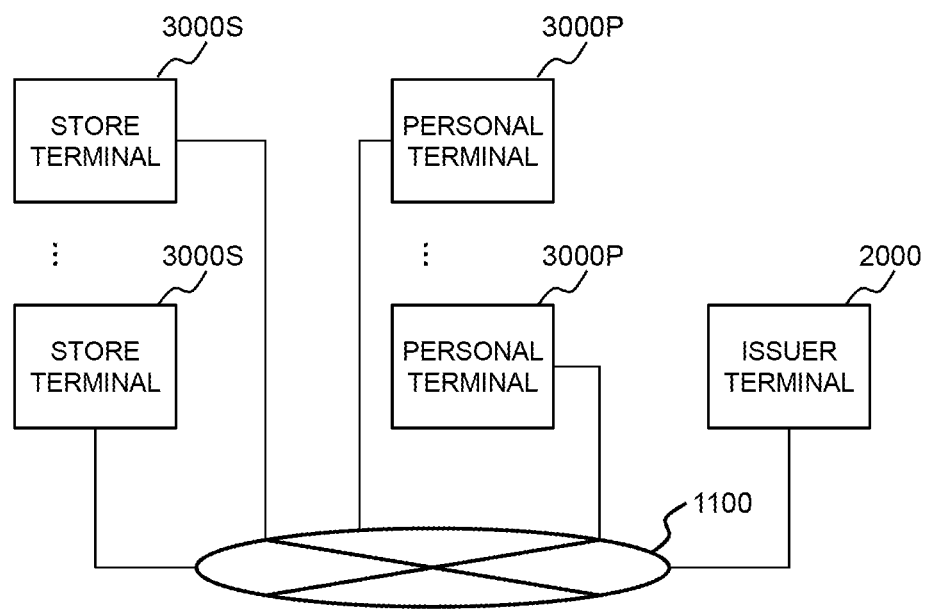
FIG. 1 is a configuration diagram of the overall system in the first embodiment of the present invention.

In the following explanation, "interface device" may be one or more interface devices. The one or more interface devices may be at least one of the following.

One or more I/O (Input/Output) interface devices. The I/O (Input/Output) interface device is an interface device for at least one of either an I/O device or a remote display computer. The I/O interface device for a display computer may be a communication interface device. The at least one I/O device may be a user interface device, for example, one of either an input device such as a keyboard or a pointing device, and an output device such as a display device.

One or more communication interface devices. The one or more communication interface devices may be one or more similar communication interface devices (for example, one or more NICs (Network Interface Cards)), or two or more different communication interface devices (for example, NIC and HBA (Host Bus Adapter)).

Moreover, in the following explanation, "memory" is one or more memory devices, and is typically a main storage device. The at least one memory device as the memory may be a volatile memory device or a nonvolatile memory device.

Moreover, in the following explanation, "persistent storage device" is one or more persistent storage devices. The persistent storage device is typically a nonvolatile storage device (for example, auxiliary storage device), and is specifically, for example, a HDD (Hard Disk Drive) or a SSD (Solid State Drive).

Moreover, in the following explanation, "storage device" may be a memory and at least a memory of the persistent storage device.

Moreover, in the following explanation, "processor" is one or more processor devices. The at least one processor device is typically a microprocessor device such as a CPU (Central Processing Unit), but may also be a different type of processor device such as a GPU (Graphics Processing Unit). The at least one processor device may be a single core or a multi core. The at least one processor device may be a processor core. The at least one processor device may be a processor device in a broad sense such as a hardware circuit (for example, FPGA (Field-Programmable Gate Array) or an ASIC (Application Specific Integrated Circuit)) which performs a part or all of the processing.

Moreover, in the following explanation, information in which an output is obtained in response to an input may be explained by using an expression such as "xxx table", but such information may be data of any structure (for example, structured data or non-structured data), or a learning model such as a neutral network which generates an output in response to an input. Accordingly, "xxx table" may also be referred to as "xxx information". Moreover, in the following explanation, the configuration of each table is merely an example, and one table may be divided into two or more tables, or all or a part of the two or more tables may be one table.

Moreover, in the following explanation, the processing may be explained by using the term "program" as the subject. However, because predetermined processing is performed by suitably using a storage device and/or an interface device as a result of the program being executed by a processor, the subject of the processing may also be the processor (or a device such as a controller equipped with such processor). A program may be installed from a program source to a device such as a computer. A program source may be, for example, a program distribution server or a computer-readable (for example, non-temporary) recording medium. Moreover, in the following explanation, two or more programs may be realized as one program, or one program may be realized as two or more programs.

Moreover, in the following explanation, when similar components are explained without differentiation, the common part within the reference number is used, and when similar components are to be differentiated, the individual reference number may be used. For example, when the transaction execution programs do not need to be differentiated, the transaction execution programs may be collectively indicated as "transaction execution program 2500", and when the transaction execution programs are to be differentiated, the transaction execution programs may individually be indicated as "transaction execution program 2500I", "transaction execution program 2500US", and "transaction execution program 2500UP".

Moreover, in the following explanation, "object" is a block of one logical electronic data as viewed from a program such as an application program. Data as an object is, for example, a record, a key value pair or a tuple. In the following explanation, a record is taken as an example of the object.

Several embodiments of the present invention are now explained with reference to the appended drawings.

First Embodiment

FIG. 1 is a configuration diagram of the overall system in the first embodiment of the present invention.

In this embodiment, as examples of a "user", there are a person and a store (example of an organization). An information processing terminal of a person is referred to as a "personal terminal", and an information processing terminal of a store is referred to as a "store terminal". The personal terminal and the store terminal may sometimes be collectively referred to as the "user terminal". Moreover, in this embodiment, there is an "issuer" that issues a currency amount which is transferred according to the transaction between the users. An information processing terminal of an issuer is referred to as an "issuer terminal". The issuer and the user are examples of a "participant".

"Currency" may be a legal currency such as Japanese yen or US dollars, or an electronic value that can be converted into legal currency, or original currency issued by the issuer. For example, when the currency is legal currency, the amount of points corresponds to the amount of money, and when the currency is "points", the currency amount corresponds to the amount of points (number of points). There is no limitation in the types of currency. While the information processing terminal is anticipated as being a portable terminal such as a smartphone, a tablet, or a laptop computer in this embodiment, the information processing terminal may also be any other computer.

Moreover, "transaction" is the processing that is executed in response to a transaction request. In this embodiment, as examples of a "transaction", there are the issue of the currency amount by the issuer to the user, the payment from the person to the store, and the remittance from one person to another person, but a transaction is not limited thereto. The expression "remittance from one person to another person" means the transfer of the currency amount from one person (more accurately, account of one person) to another person (more accurately, account of another person). The currency amount transferred from the account of one person does not necessarily have to be the same as the currency amount remitted to the account of the other person (for example, a certain currency amount may be deducted as fees).

A store terminal 3000S, a personal terminal 3000P, and an issuer terminal 2000 communicate via a network 1100. There is no limitation in the number of the store terminal 3000S, the personal terminal 3000P and the issuer terminal 2000. The internal configuration of the store terminal, the personal terminal, and the issuer terminal will be described later.

The network 1100 may be a wireless network such as 3G, 4G, 5G, WiMAX (registered trademark), or Wi-Fi (registered trademark), a wired network such as Ethernet (registered trademark), or a mixed environment of the above.

Figure 2:
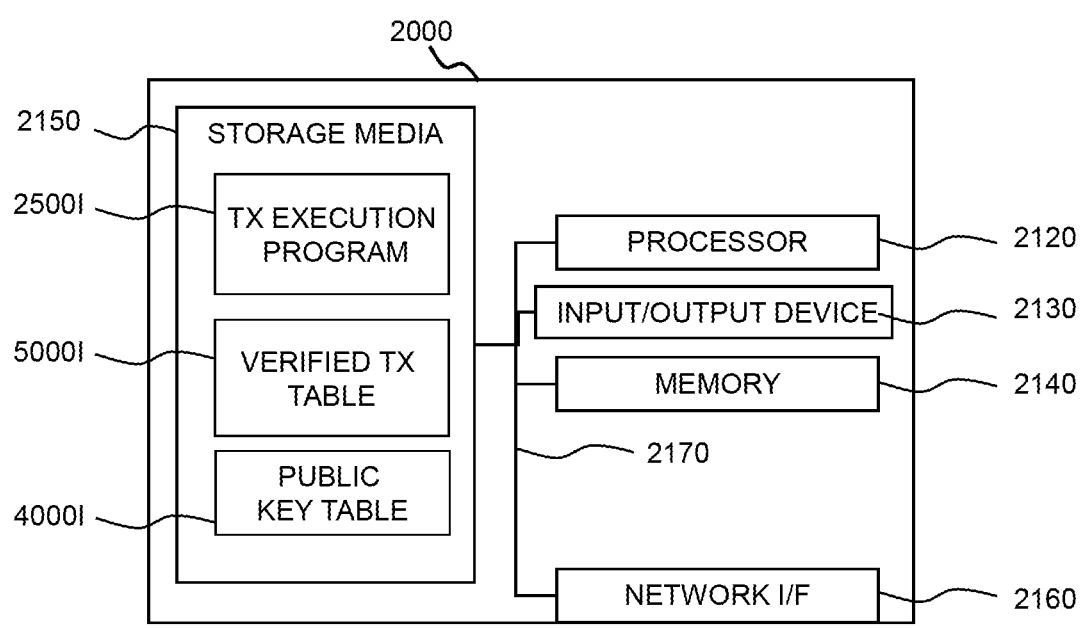
FIG. 2 is a configuration diagram of the issuer terminal in the first embodiment of the present invention.

FIG. 2 is a configuration diagram of the issuer terminal 2000. Note that, in the drawings, a transaction is abbreviated as "TX".

The issuer terminal 2000 is configured from a processor 2120, an input/output device 2130, a memory 2140, a storage media 2150, a network I/F 2160 and an internal network 2170. The storage media 2150 is an example of a persistent storage device, and the memory 2140 and the storage media 2150 are examples of a storage device. The network I/F 2160 is an example of an interface device.

The input/output device 2130 is a device such as a keyboard, a mouse, or a display which receives the user's input/output. The network I/F 2160 is an I/F with the network 1100.

The internal network 2170 is a network which mutually connects the constituent elements in the issuer terminal 2000.

The issuer terminal 2000 may be a physical computer, or a virtual environment (for example, hypervisor-type virtual environment, or container-type virtual environment) built on one or more physical computers (for example, cloud infrastructure). Furthermore, the issuer terminal 2000 may also be configured by comprising a near field communication I/F as with the personal terminal 3000P and the store terminal 3000S described later so as to enable near field communication with the personal terminal 3000P and the store terminal 3000S. As near field communication, while BLUETOOTH LOW ENERGY ("BLUETOOTH" is a registered trademark) or NEAR FIELD COMMUNICATION (NFC) is anticipated, any other standard communication may also be adopted. Moreover, near field communication may also be referred to as short-range communication. Moreover, without limitation to wireless communication, near field communication may also be wired communication.

The storage media 2150 stores a transaction execution program 2500I, a public key table 4000I and a verified transaction table 5000I.

In this embodiment, while it is anticipated that the transaction execution program 2500I stored in the storage media 2150 is loaded into the memory 2140 by the processor 2120 at the time of execution and then executed, the configuration is not limited thereto, and a part or the whole thereof may also be executed in the storage media 2150. Moreover, in this embodiment, the use of a nonvolatile memory such as an HDD or SSD is anticipated as the storage media 2150, and the use of a volatile media such as a DRAM (Dynamic Random Access Memory) is anticipated as the memory 2140. Nevertheless, the configuration may also be a mode without the memory 2140, and all programs in the storage media 2150 being executed and tables being read and written. A function such as the transaction execution unit in the issuer terminal 2000 is realized by the transaction execution program being executed by the processor 2120.

Note that all or a part of the public key table 4000 and the verified transaction table 5000 may also be stored in an external storage device connected to the network 1100.

Figures 3, 4:
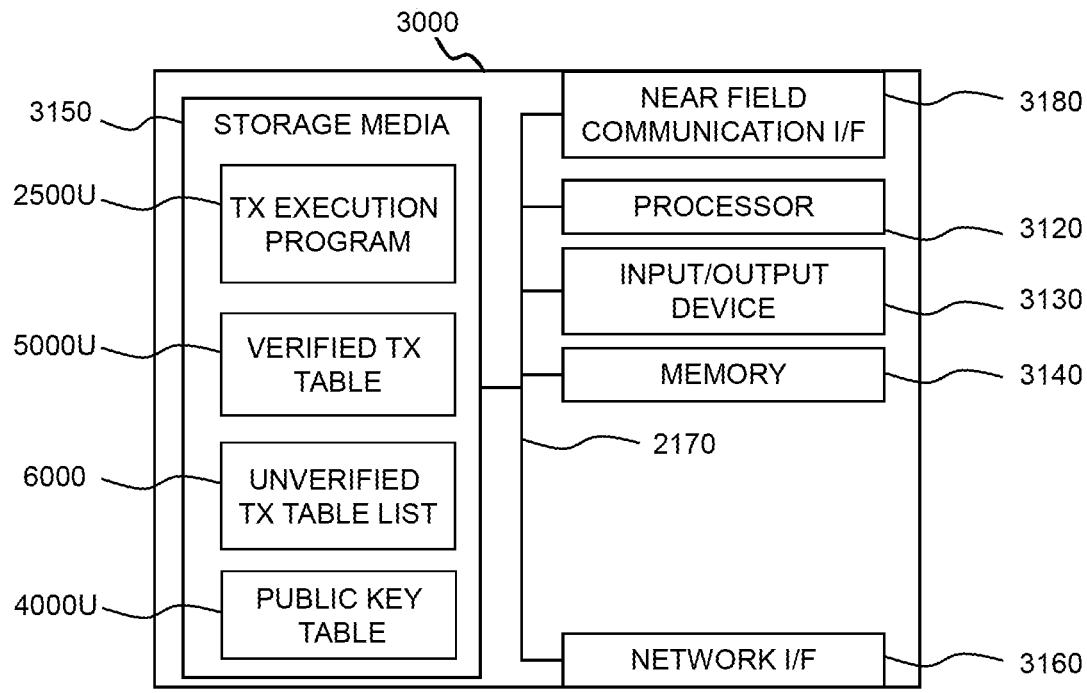
FIG. 3 is a configuration diagram of the user terminal in the first embodiment of the present invention.
FIG. 4 is a configuration diagram of the public key table in the first embodiment of the present invention.

FIG. 3 is a configuration diagram of the user terminal 3000.

The user terminal 3000 is configured from a processor 3120, an input/output device 3130, a memory 3140, a storage media 3150, a network I/F 3160, an internal network 3170 and a near field communication I/F 3180.

The input/output device 3130 is a device such as a touch panel, a keyboard, a mouse, a camera, a microphone, or a display which receives the user's input/output. The network I/F 3160 is an I/F with the network 1100. The internal network 3170 is a network which mutually connects the constituent elements in the terminal 3000. The storage media 3150 is an example of a persistent storage device, and the memory 3140 and the storage media 3150 are examples of a storage device. The network I/F 2160 is an example of an interface device.

The storage media 3150 stores a transaction execution program 2500U, a public key table 4000U, a verified transaction table 5000U and a unverified transaction table list 6000.

In this embodiment, while it is anticipated that the transaction execution program 2500U stored in the storage media 3150 is loaded into the memory 3140 by the processor 3120 at the time of execution and then executed, the configuration is not limited thereto, and a part or the whole thereof may also be executed in the storage media 3150. Moreover, in this embodiment, the use of a nonvolatile memory such as an HDD or SSD is anticipated as the storage media 3150, and the use of a volatile media such as a DRAM is anticipated as the memory 3140. Nevertheless, the configuration may also be a mode without the memory 3140, and all programs in the storage media 3150 being executed and tables being read and written.

Note that all or a part of the public key table 4000U, the verified transaction table 5000U, and the unverified transaction table list 6000 may also be stored in an external storage device connected to the network 1100.

Note that, in the following explanation, "S" may be affixed to the end of the reference numeral of elements in the store terminal 3000S and "P" may be affixed to the end of the reference numeral of elements in the personal terminal 3000P to avoid confusion.

FIG. 4 is a configuration diagram of the public key table 4000.

The public key table 4000 retains a public key of each participant. Specifically, for example, the public key table 4000 holds a record for each participant. Each record retains, for example, information such as an ID 4110 and a public key 4120. In the following explanation, one participant is taken as an example (this participant is hereinafter referred to as the "particular participant" in the explanation of FIG. 4).

The ID 4110 is an ID for uniquely identifying the particular participant. The public key 4120 is a public key of the particular participant.

FIG. 5 is a configuration diagram of the verified transaction table 5000.

The verified transaction table 5000 is an aggregate of verified transaction records. Specifically, for example, the verified transaction table 5000 may be a time sequence of the verified transaction records, and may adopt a DAG (Directed Acyclic Graph) structure as an example. When the DAG structure is adopted, the node is the verified transaction record, and the edge represents the order of verification of the transaction records. A "verified transaction record" is a transaction record that represents a verified transaction. A "transaction record" is a record that represents a transaction. A "verified transaction" is a transaction that represents a transaction object which has been verified by a verifier. While a "verifier" is any of the user terminals 3000 in this embodiment, the verifier may also be the issuer terminal 2000, or an information processing terminal other than the issuer terminal 2000 and the user terminal 3000.

The verified transaction table 5000 holds, for example, a transaction record for each verified transaction. Each transaction record retains, for example, information such as a source ID 5110, a destination ID 5120, a currency amount 5130, a transaction time 5140, a source signature 5150, a destination signature 5160, a verification time 5170 and a verifier signature 5180. In the following explanation, one verified transaction is taken as an example (this verified transaction is hereinafter referred to as the "particular verified transaction" in the explanation of FIG. 5).

The source ID 5110 is an ID for uniquely identifying the source in the particular verified transaction. Note that a "source" is a transfer source of the currency amount. Accordingly, the source is the issuer in the case of issue of the currency amount, is the person (payer) in the case of payment, and is one person (payer) in the case of remittance between persons.

The destination ID 5120 stores an ID for uniquely identifying the destination of the particular verified transaction. Note that a "destination" is a transfer destination of the currency amount. Accordingly, the destination is the user in the case of issue of the currency amount, is the store (recipient) in the case of payment, and is the other person (payee) in the case of remittance between persons.

The currency amount 5130 represents the amount of currency to be transferred in the particular verified transaction. The transaction time 5140 represents the time that the transaction data, which is associated with the transaction request corresponding to the particular verified transaction, was created. The created transaction data includes, for example, information such as the source ID, the destination ID, the currency amount and the transaction time, but does not include additional information such as the source signature, the destination signature, the verification time and the verifier signature.

The source signature 5150 is an electronic signature that was assigned by the source to the transaction data in the particular verified transaction. The destination signature 5160 is an electronic signature that was assigned by the destination to the transaction data in the particular verified transaction.

The verification time 5170 represents the time that the unverified transaction record, which was the basis of the transaction record of the particular verified transaction, was verified. The verifier signature 5180 is an electronic signature that was assigned by the verifier, which verified the unverified transaction record, to that unverified transaction record.

FIG. 6 is a configuration diagram of the unverified transaction table list 6000.

The unverified transaction table list 6000 includes an unverified transaction table 6210 for each user who was involved in one or more unverified transactions related to a user of the user terminal 3000 holding the list 6000. In the following explanation, one user is taken as an example (this user is hereinafter referred to as the "particular user" in the explanation of FIG. 6). Note that an "unverified transaction" is a transaction that represents an unverified transaction record. An "unverified transaction record" is a transaction record that has not yet been verified by a verifier.

The unverified transaction table 6210 is a time sequence of the unverified transaction records in which the replicated record of the latest verified transaction record related to the particular user is used as the head record. The node is the verified transaction record or the unverified transaction record, and the edge represents the order of addition of the unverified transaction records. Each record retains information such as a user ID 6105, a source ID 6110, a destination ID 6120, a currency amount 6130, a transaction time 6140, a source signature 6150, a destination signature 6160, a verification time 6170 and a verifier signature 6180. In the following explanation, one unverified transaction is taken as an example (this unverified transaction is hereinafter referred to as the "particular unverified transaction" in the explanation of FIG. 6).

The user ID 6105 is a user ID of the particular user corresponding to the particular unverified transaction. The source ID 6110 is an ID for uniquely identifying the source in the particular unverified transaction. The destination ID 6120 is an ID for uniquely identifying the destination in the particular unverified transaction. The value of the user ID 6105 is either the value of the source ID 6110 or the value of the destination ID 6120.

The currency amount 6130 represents the amount of currency to be transferred in the particular unverified transaction. The transaction time 6140 represents the time that the transaction data, which is associated with the transaction request corresponding to the particular unverified transaction, was created.

The source signature 6150 is an electronic signature that was assigned by the source to the transaction data in the particular unverified transaction. The destination signature 6160 is an electronic signature that was assigned by the destination to the transaction data in the particular unverified transaction.

The verification time 6170 and the verifier signature 6180 are empty with regard to the particular unverified transaction. When the record retained in the verification time 6170 and the verifier signature 6180 is a head record; that is, a replicated record of the latest verified transaction record related to the particular user, the verification time 6170 represents the time that the unverified transaction record, which was the basis of the transaction record of the verified transaction, was verified. The verifier signature 6180 is an electronic signature that was assigned by the verifier, which verified the unverified transaction record, to that unverified transaction record.

According to the example of FIG. 6, the respective values of the verification time 6170 and the verifier signature 6180 are stored only in the first record of each of the unverified transaction tables 6210A to 6210C. The unverified transaction table 6210 is a table which is created and added, when a transaction request is sent and at least one user terminal 3000 of a payer and a payee in relation to such request is offline, in relation to such payer or payee.

When an unverified transaction record is verified, for example, according to a predetermined endorsement policy, the unverified transaction record is transferred to the verified transaction record. In other words, a verified transaction record becomes newly added (such verified transaction record becomes a verified transaction record of a new terminal), and the unverified transaction record is deleted from the unverified transaction table 6210.

The configuration of the unverified transaction table list 6000 is as explained above.

Figure 7:
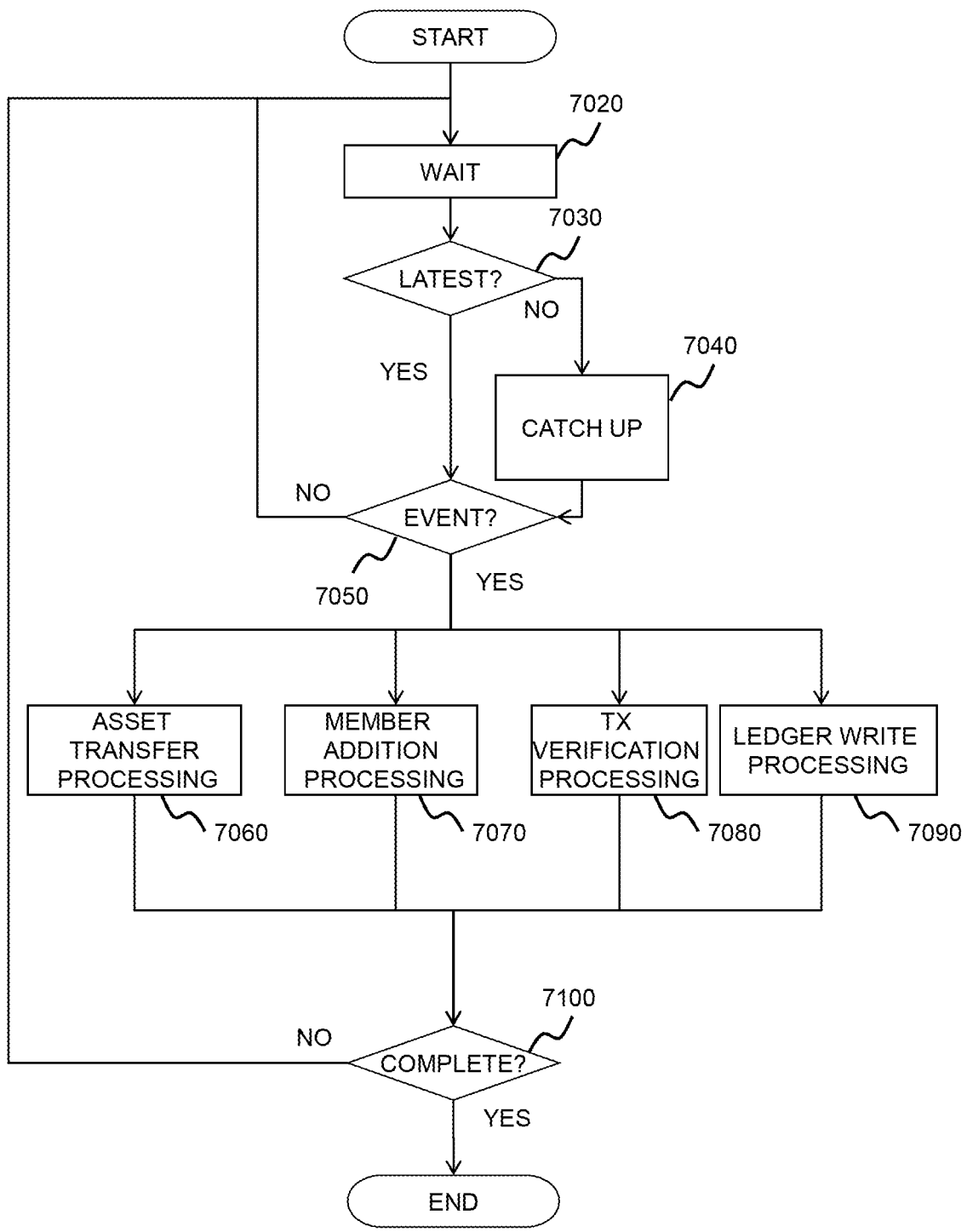
FIG. 7 is an overall flowchart of the transaction execution program in the first embodiment of the present invention.

FIG. 7 is an overall flowchart of the transaction execution program 2500.

After the transaction execution program 2500 is started, in step 7020, the transaction execution program 2500 waits for a given period of time. In the explanation of FIG. 7, the terminal to execute the program 2500 is referred to as the "own terminal", and each terminal other than the own terminal is referred to as the "other terminal".

In step 7030, the transaction execution program 2500 confirms whether the verified transaction table 5000 retained in the own terminal is up to date by making an inquiry to the other terminals. If the verified transaction table 5000 retained in the own terminal is not up to date as a result of the network 1100 becoming temporarily offline or any other reason, the transaction execution program 2500 advances the processing to step 7040. If the verified transaction table 5000 is up to date, the transaction execution program 2500 advances the processing to step 7050.

In step 7040, the transaction execution program 2500 performs update processing. This update processing includes, for example, the following two types of processing.

(1) If there is a verified transaction record that is not retained in the verified transaction table 5000 of the own terminal in the verified transaction table 5000 of the other terminal which is online, the transaction execution program 2500 copies such record to the verified transaction table 5000 of the own terminal.

(2) The transaction execution program 2500 performs the following processing for each user ID 6105 to the unverified transaction table list 6000 in the own terminal.

In cases where the verification time 6170 and the verifier signature 6180 are empty in the unverified transaction table list 6000 or if one or more transaction records exist as verified transaction records in the verified transaction table 5000, the transaction execution program 2500 uses the latest verified transaction record among those verified transaction records as the verified transaction record related to the user ID, and newly stores the same in the unverified transaction table 6210 corresponding to the user ID. Within the unverified transaction table 6210, transaction records that are older than the latest verified transaction record (records in which the time represented by the verification time 6170 is older) have previously been stored in the verified transaction table 5000 as the verified transaction records. Thus, the transaction execution program 2500 deletes such old transaction records from the unverified transaction table list 6000. Consequently, the latest verified transaction record becomes the head record in the latest verified transaction record.

In step 7050, the transaction execution program 2500 determines whether an event has arrived. If an event has arrived, the processing is advanced to any one of step 7060 to step 7090 according to the event type. If an event has not arrived, the processing is advanced to step 7020. Note that an "event" is a trigger of any step from step 7060 to step 7090. For example, in terms of the asset transfer processing of step 7060, the following can be considered as an example.

If the own terminal is the source, the user of the own terminal performed an operation for requesting the asset transfer processing.

If the own terminal is the destination, a transaction request was received from the other terminal.

Figure 8:
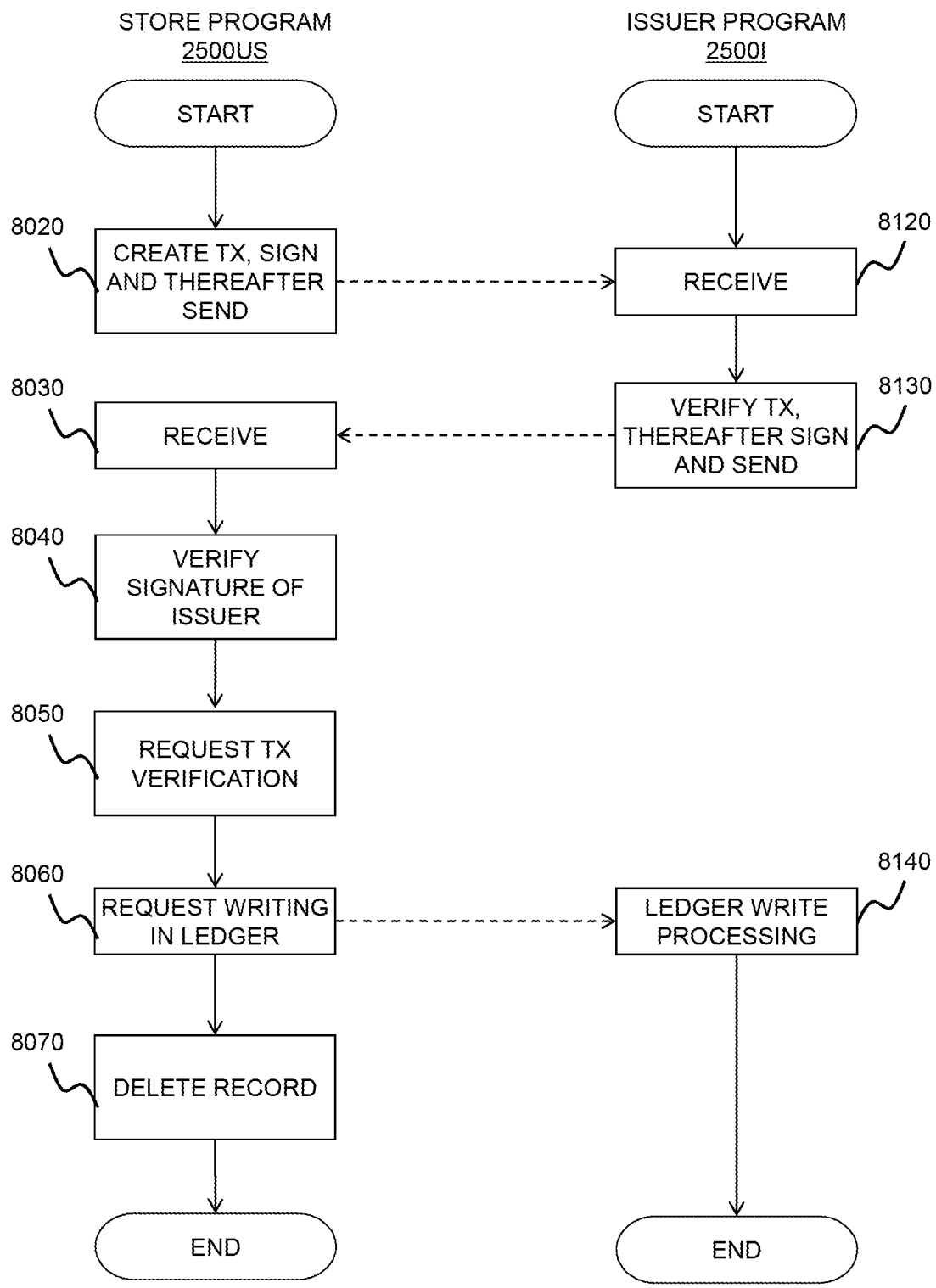
FIG. 8 is a flowchart showing the first class asset transfer processing in the first embodiment of the present invention.
Figure 9:
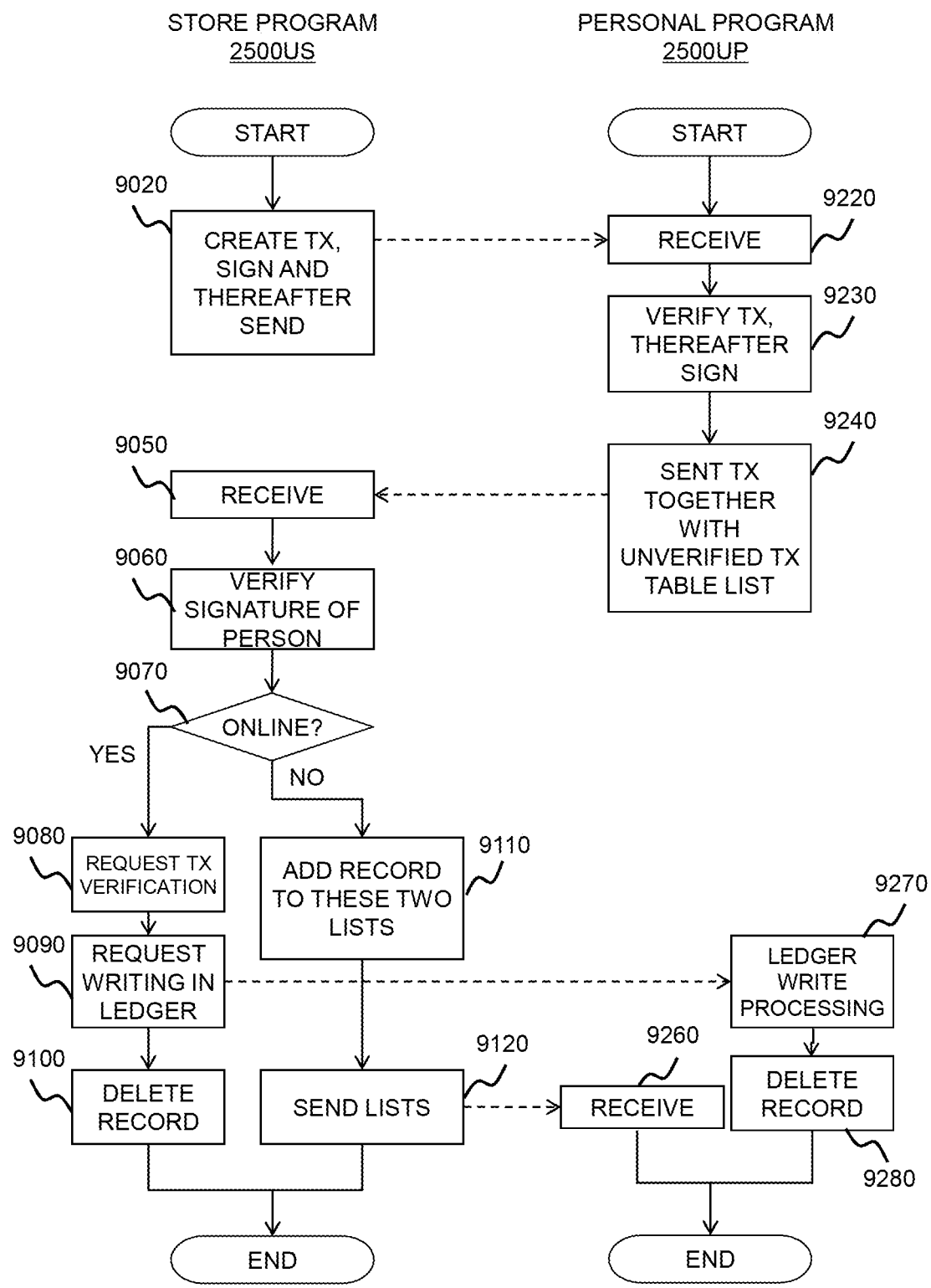
FIG. 9 is a flowchart showing the second class asset transfer processing in the first embodiment of the present invention.

In step 7050, if the event type is an "asset transfer request", the asset transfer processing described in FIG. 8 or FIG. 9 is performed in step 7060.

In step 7050, if the event type is a "member addition request", the processing is advanced to step 7070. In step 7070, the transaction execution program 2500 adds, to the public key table 4000, a public key of the user to be added.

In step 7050, if the event type is a "transaction verification request", the processing is advanced to step 7080. In step 7080, the transaction execution program 2500 performs the transaction verification processing described in FIG. 10.

In step 7050, if the event type is "ledger write processing", the processing is advanced to step 7090. In step 7090, the transaction execution program 2500 adds, to the verified transaction table 5000, the one or more transaction records received holding the temporary table described later (aggregate of replications of unverified transaction records to become verified transaction records).

When one step among step 7060 to step 7090 is completed, the processing is advanced to step 7100. In step 7100, the transaction execution program 2500 confirms whether an end instruction was given from a user or an administrator. If an end instruction was given, the processing is ended. If an end instruction was not given, the processing returns to step 7020.

FIG. 8 is a flowchart showing the first class asset transfer processing.

The first class asset transfer processing is the processing of issuing a currency amount from the issuer terminal to the user terminal. Thus, the source is the issuer and the destination is the user. In the explanation of FIG. 8, let it be assumed that the destination user is the store. The transaction execution program 2500I of the issuer terminal 2000 is hereinafter indicated as the "issuer program 2500I". Moreover, the transaction execution program 2500U of the store terminal 3000S is hereinafter indicated as the "store program 2500US". Moreover, in the explanation of FIG. 8, "S" may be affixed to the end of the reference numeral of elements in the store terminal 3000S. In this embodiment, let it be assumed that the following is the premise.

The store terminal 3000S and the issuer terminal 2000 are connected via the network 1100.

The issuer terminal 2000 is constantly online.

The first class asset transfer processing is executed in the constantly online environment.

In step 8020, the store program 2500US creates transaction data including information representing the source ID, the destination ID, the currency amount and the transaction time. A transaction represented by the transaction data is the processing of having the issuer issuing, to the store, the store's intended currency amount. The source ID is the ID of the issuer, and the destination ID is the ID of the store. The store program 2500US assigns the store's electronic signature to the transaction data, and sends a transaction request having the transaction data with the signature to the issuer terminal 2000. The store's electronic signature is generally generated by encrypting the hash value of the transaction data with the store's private key.

In step 8120, the issuer program 2500I receives the transaction request. Thereafter, in step 8130, the issuer program 2500I performs signature verification, which is the verification of the electronic signature of the transaction data in the request; that is, the verification of the store's electronic signature. For example, the following is performed.

The issuer program 2500I identifies, from the public key table 4000I, the public key 4120 corresponding to the ID 4110 which coincides with the destination ID (store ID) having the transaction data.

The issuer program 2500I acquires the hash value of the transaction data by decoding the electronic signature with the identified public key 4120, and compares the acquired hash value of the transaction data and the hash value of the transaction data in the received request. If the data coincide as a result of the comparison, the signature verification is successful.

When the signature verification is successful, the issuer program 2500I assigns the issuer's electronic signature to a reply in response to the transaction request, and returns the reply with the signature to the store terminal 3000S.

In step 8030, the store program 2500US receives the reply with the signature. Thereafter, in step 8040, the store program 2500US performs signature verification, which is the verification of the issuer's electronic signature (signature in the reply). When the signature verification is successful, the processing is advanced to step 8050.

In step 8050, the store program 2500US makes a transaction verification request. Specifically, for example, if the store program 2500US has an unverified transaction table list 6000 in which the store terminal 3000S is not empty, the store program 2500US adds, to the end of the unverified transaction table 6210 corresponding to the user ID which matches the issuer ID, the transaction record including the transaction data created in S8020, and requests one or more verifiers to verify the overall unverified transaction table list 6000. The verifier to become the request destination and the number of verifiers to become the request destination may be determined in advance according to some kind of policy, or determined randomly. The transaction verification processing is performed by the verifier that received the verification request. When the verification processing is successful, the verifier's signature and the verification time are recorded in the verified transaction record.

When the transaction verification request is ended, in step 8060, the store program 2500US makes a ledger write request based on the result of the transaction verification request. This processing broadcasts the verified transaction record, and the terminal that received the verified transaction record executes ledger write processing (processing that is the same as step 7090 of FIG. 7). "Ledger write processing" is the processing of adding, to the verified transaction table 5000, the transaction record that was successfully verified (specifically, transaction record recorded in the temporary table described later) among the unverified transaction records in the unverified transaction table list 6000. Note that the range of broadcast may be all terminals that are online, or all terminals other than the personal terminal that are online, or only specific terminals. Moreover, in step 8060, the store program 2500US may add, to the verified transaction table 5000US, the transaction record that was successfully verified among the unverified transaction records in the unverified transaction table list 6000S.

As a part of the broadcast processing, the issuer program 2500I executes the ledger write processing in step 8140.

When the store program 2500US ends the ledger write processing in step 8060, the store program 2500US, in step 8070, deletes the records reflected in the verified transaction table 5000US among the records in the unverified transaction table list 6000S, and uses the latest record among the deleted records as the head record for each of the unverified transaction tables 6210S.

The first class asset transfer processing is as explained above. Note that, in this processing, the transaction data and the transaction request may also be created by the issuer program 2500I in substitute for the store program 2500US, and sent to the store terminal 3000S.

FIG. 9 is a flowchart showing the second class asset transfer processing.

The second class asset transfer processing is the processing of transferring a currency amount between users. In the example of FIG. 9, one user is the store and the other user is the person, and anticipated is a case where the person makes payment for a purchase at the store. In the explanation of FIG. 9, the transaction execution program 2500US of the store terminal 3000S is referred to as the "store program 2500US", and the transaction execution program 2500UP of the personal terminal 3000P is referred to as the "personal program 2500UP". Communication between the store terminal 3000S and the personal terminal 3000P is anticipated to be near field communication, but such communication may also be communication via the network 1100. In the following explanation, "S" may be affixed to the end of the reference numeral of elements in the store terminal 3000S, and "P" may be affixed to the end of the reference numeral of elements in the personal terminal 3000P.

In step 9020, the store program 2500US creates transaction data including information representing the source ID, the destination ID, the currency amount and the transaction time. A transaction represented by the transaction data is the processing of having the person pay the currency amount to the store. The source ID is the ID of the person, and the destination ID is the ID of the store. The store program 2500US assigns the store's electronic signature to the transaction data, and sends a transaction request having the transaction data with the signature to the personal terminal 3000P.

In step 9220, the personal program 2500UP receives the transaction request. Thereafter, in step 9230, the personal program 2500UP performs signature verification, which is the verification of the electronic signature of the transaction data in the request; that is, the verification of the store's electronic signature. When the signature verification is successful, the personal program 2500UP assigns the person's electronic signature to a reply in response to the transaction request. In step 9240, the personal program 2500UP acquires the unverified transaction table list 6000 retained in the personal terminal 3000P, and returns the reply with the signature in the list 6000 to the store terminal 3000S.

In step 9050, the store program 2500US receives the reply with the signature. Thereafter, in step 9060, the store program 2500US performs signature verification, which is the verification of the person's signature (signature in the reply). When the signature verification is successful, in step 9070, the store program 2500US determines whether the store terminal 3000S is online.

If the store terminal 3000S is online in step 9070, the store program 2500US makes a transaction verification request in step 9080. Specifically, for example, if the store program 2500US has an unverified transaction table list 6000S in which the store terminal 3000S is not empty, the store program 2500US adds, to the end of the unverified transaction table 6210S corresponding to the user ID which matches the person ID, the transaction record including the transaction data created in S9020, and requests one or more verifiers to verify the overall unverified transaction table list 6000S. The verifier to become the request destination and the number of verifiers to become the request destination may be determined in advance according to some kind of policy, or determined randomly. The transaction verification processing is performed by the verifier that received the verification request. When the verification processing is successful, the verifier's signature and the verification time are recorded in the verified transaction record.

When the transaction verification request is ended, in step 9090, the store program 2500US makes a ledger write request. This processing is the same as step 8060. Moreover, in step 9090, the store program 2500US may add, to the verified transaction table 5000US, the transaction record that was successfully verified among the unverified transaction records in the unverified transaction table list 6000S of the store terminal 3000S.

As a part of the broadcast processing, the personal program 2500UP executes the ledge write processing in step 9270. Note that, when the store terminal 3000S is online but the personal terminal 3000P is offline, let it be assumed that the transmission/reception of the verified transaction record is performed via each other's near field communication I/F 3180.

When the ledger write processing is ended, the store program 2500US, in step 9100, deletes the records reflected in the verified transaction table 5000US among the records in the unverified transaction table list 6000S, and uses the latest record among the deleted records as the head record for each of the unverified transaction tables 6210S.

Similarly, the personal program 2500UP, in step 9280, deletes the records reflected in the verified transaction table 5000UP among the records in the unverified transaction table list 6000P, and uses the latest record among the deleted records as the head record for each of the unverified transaction tables 6210P.

If the store terminal 3000S is offline in step 9070, because the transaction cannot be determined, the store program 2500US, in step 9110, respectively adds, to the unverified transaction table list 6000S, and the unverified transaction table list 6000P in the reply received in step 9050, the unverified transaction record to which the signatures of the store and the person have been assigned (unverified transaction record including the transaction data created in step 9020). Thereafter, in step 9120, the store program 2500US sends the updated unverified transaction table list 6000P to the personal terminal 3000P.

When the personal program 2500UP receives the updated unverified transaction table list 6000P in step 9260, the personal program 2500UP updates the retained unverified transaction table list 6000P based on the received table list 6000P. That is, the list 6000P is replaced with the updated list 6000P that was received.

The second class asset transfer processing is as explained above.

Note that, in this processing, the transaction data and the transaction request may also be created by the issuer terminal 2000, in substitute for the store terminal 3000S, and sent to the store terminal 3000S when online.

Moreover, the second class asset transfer processing illustrated in FIG. 9 is the processing of transferring assets (currency amount) from the person to the store, but the same routine as the routine shown in FIG. 9 may be performed also for the processing of transferring assets from one person to another person; that is, remittance between persons. Specifically, by replacing "store" in the explanation of FIG. 9 with "person", the explanation of FIG. 9 will correspond to the explanation of remittance between persons.

Moreover, even when transferring assets from the store to the person, the same routine as the routine shown in FIG. 9 may be performed. For example, as the foregoing case, considered may be a case of a store that is employing a person transferring assets to the person as a salary, or a case of a store transferring some kind of reward as assets to a person.

Figure 10:
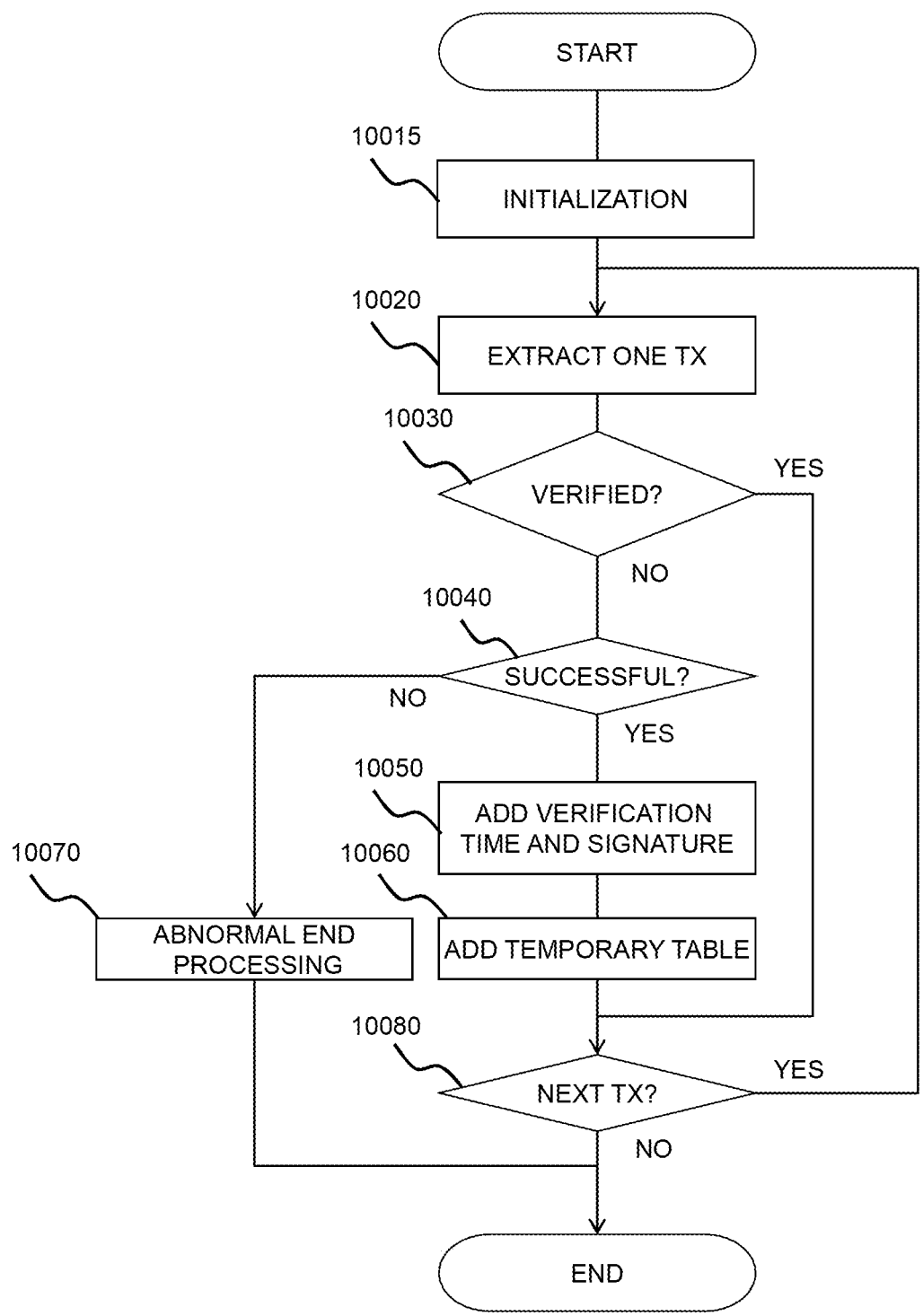
FIG. 10 is a flowchart showing the transaction verification processing in the first embodiment of the present invention.

FIG. 10 is a flowchart showing the transaction verification processing.

The transaction verification processing is performed by the verifier that received the transaction verification request. In this embodiment, the verifier may be any user terminal 3000. The transaction verification processing is started when the transaction execution program 2500 of the user terminal 3000 receives the transaction verification request. The request has the unverified transaction table list 6000, but may also have the unverified transaction record of a part of the list 6000 in substitute therefor (for example, unverified transaction table 6210 corresponding to the user ID that matches the source ID or the destination ID in the transaction data, or a single unverified transaction record).

In step 10015, the transaction execution program 2500 performs initialization processing. Specifically, the transaction execution program 2500 creates an empty temporary table in the memory 3140. The configuration of the temporary table is the same as the verified transaction table 5000.

In step 10020, the transaction execution program 2500 extracts one unprocessed head unverified transaction record from one of the tables 6210 in the received unverified transaction table list 6000. That is, processing is sequentially performed from the head unverified transaction record of the table 6210.

In step 10030, the transaction execution program 2500 determines whether the extracted unverified transaction record has been verified. When the verified transaction record having information 5110 to 5160, which is the same as information 6110 to 6160 in that record, exists in the verified transaction table 5000, that unverified transaction record has been verified. When the unverified transaction record is determined to have been verified, the processing is advanced to step 10080.

When the unverified transaction record is determined not to have been verified, in step 10040, the transaction execution program 2500 verifies the unverified transaction record extracted in step 10020. The verification is performed, for example, by using the source signature 6150 and the destination signature 6160 assigned to that transaction record.

When the verification is unsuccessful in step 10040, the transaction execution program 2500 performs abnormal end processing, such as outputting an error message, in step 10070.

When the verification is successful in step 10040, the transaction execution program 2500 assigns the verification time 6170 and the verifier signature 6180 to the record that was successfully verified in step 10050. In step 10060, the transaction execution program 2500 adds the record to a temporary table.

In step 10080, the transaction execution program 2500 confirms whether there is any unprocessed unverified transaction record in the received unverified transaction table list 6000. If there is a remaining record, the processing is advanced to step 10020. If there is no remaining record, the transaction execution program 2500 sends the temporary table, as a reply, to the transaction execution program of the source of the verification request. The transaction execution program 2500 that received the reply adds, to the verified transaction table 5000 in the terminal executed by the program 2500, the verified transaction record in the temporary table of the reply in step 8060 or step 9090.

Figure 11:
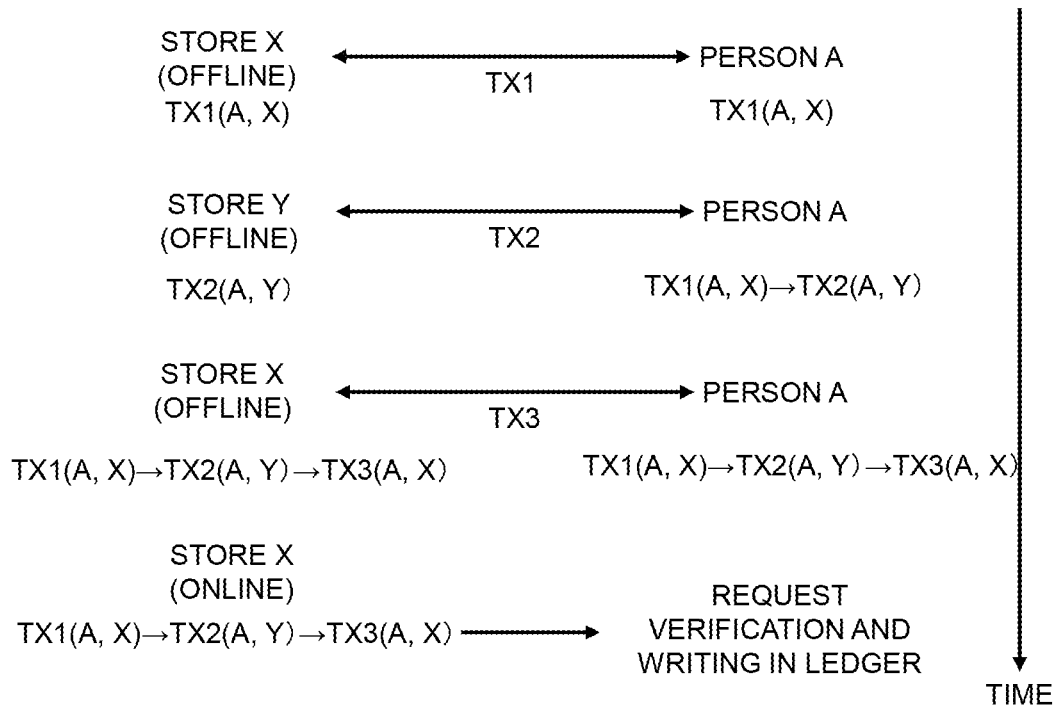
FIG. 11 is a diagram showing an example of the addition of unverified transaction records to the unverified transaction table in the first embodiment of the present invention.

The first embodiment is as explained above. According to the first embodiment, the unverified transaction record will increase as illustrated in FIG. 11, and eventually be added to the verified transaction table 5000. In other words, this will be as follows.

When a person A purchases a product from a store X, a transaction TX1 of paying a currency amount from the person A (source) to the store X (destination) will arise. When this transaction is conducted offline, an unverified transaction record of TX1 (A, X) is added to the unverified transaction table 6210S in the terminal 3000S of the store X, and to an unverified transaction table 6210P in the terminal 3000P of the person A.

Thereafter, when the person A purchases a product from a different store Y and conducts this transaction offline, a transaction TX2 of paying a currency amount from the person A to the store Y will arise. Thus, an unverified transaction record of TX2 (B, X) is added to the unverified transaction table 6210S in the terminal 3000S of the store Y, and added as the next record of TX1 (A, X) to the unverified transaction table 6210P in the terminal 3000P of the person A.

Thereafter, when the person A once again purchases a product from the store X and conducts this transaction offline, a transaction TX3 of paying a currency amount from the person A to the store X will arise. Moreover, the records of the series of unverified transactions up to TX3 within the unverified transaction record group in the terminal 3000P of the person A are added to the unverified transaction table 6210S of the terminal 3000S of the store X, and an unverified transaction record of TX3 (A, X) is thereafter added. Consequently, the series of unverified transaction records of TX1 (A, X)→TX2 (A, Y)→TX3 (A, X) will be retained regarding both the store X and the person A. The terminal 3000S of the store X will retain an unrelated transaction (transaction of another store Y) in which the store X is neither the source nor the destination.

Thereafter, when the terminal 3000S of the store X goes online, the verification requests of TX1 (A, X), TX2 (A, Y) and TX3 (A, X) are sequentially issued, and TX1 (A, X), TX2 (A, Y) and TX3 (A, X) are added to the verified transaction table 5000. According to this example, as a result of the terminal 3000S of the store X going online, payment will be made to another store Y.

In the first embodiment, while all terminals have the verified transaction table 5000, the configuration is not limited thereto. For example, the personal terminal 3000P may retain only the verified transaction record of a transaction related to the person of the terminal 3000P (transaction in which the person is either the source or the destination). Furthermore, the retention period of the verified transaction record in the personal terminal 3000P may be prescribed (for example, 1 day or 1 week). It is thereby possible to reduce the consumed storage capacity of the storage media 3150 of the personal terminal 3000P. Moreover, the personal terminal 3000P may omit the transaction verification processing.

Moreover, in the first embodiment, a distributed ledger technology of verifying the transaction record and each of the plurality of terminals having the verified transaction table 5000 has been applied. While the verified transaction table 5000 was adopted as an example of the ledger, the ledger may also be a UTXO (Unspent Transaction Output) in which the transaction itself is described. In the foregoing case, the object to be the node may be a transaction, and the relationship representing the edge may be the relationship between transactions.

Moreover, in the first embodiment, while one terminal participating in this system performs the transaction verification processing, the configuration may also be such that the terminal of a participant referred to as a Notary may single-handedly undertake the transaction verification processing.

Moreover, a centralized structure may be adopted in substitute for a distributed structure. For example, a configuration of the centralized structure by the issuer may be adopted. The verified transaction table may be retained only by the issuer terminal 2000, and the transaction verification processing may also be performed only by the issuer terminal 2000 (that is, the verifier may only be the issuer terminal 2000). It is thereby possible to reduce the system investment of the store or the person.

Moreover, a method of reducing the number of online transactions may also be applied. For example, the credit worthiness of each user (for example, store or person) based on the user's transaction history may be calculated by the issuer program 2500I, the store program 2500US or the personal program 2500UP. A transaction between users whose credit worthiness exceeds a certain level may be caused to be an offline transaction. Specifically, for example, when the transaction execution program 2500 identifies that the source and/or the destination is exceeding a certain level of frequency of use regarding transactions, the transaction is conducted offline via near field communication even if the terminal to execute the program 2500 is online (that is, the record of such transaction is added to the unverified transaction table). It is thereby possible to reduce the number of online transactions and reduce the load of the terminal. The transaction history may be identified by referring to the verified transaction table 5000. The frequency of use may be a score, or the number of transactions conducted between the same users. For example, if the transaction conducted between the same users is the second transaction onward, such transaction may be conducted offline. Moreover, the verification of a given number of unverified transaction records may be requested and the ledger write processing may be performed online after such given number of unverified transaction records has been accumulated, or after the lapse of a given period of time from the transaction time of the head unverified transaction record.

Moreover, in the first embodiment, according to FIG. 9, a transaction verification request is not made when the store terminal 3000S is offline. Nevertheless, the following modified example may also be adopted. For example, the store program 2500US notifies the personal program 2500UP, via near field communication, to the effect that the store terminal 3000S was offline. The personal program 2500UP that received the foregoing notice determines whether the personal terminal 3000P is online. When the personal terminal 3000P is online, the personal program 2500UP requests the verification of the transaction record including the transaction data generated in step 9020. When this verification is successful, that transaction record is reflected in the verified transaction table 5000. It is thereby possible to avoid the bloating of the unverified transaction table list 6000.

Second Embodiment

The second embodiment is now explained. Here, the differences in comparison to the first embodiment will be mainly explained, and the explanation of points that are common with the first embodiment will be omitted or simplified.

Figure 12:
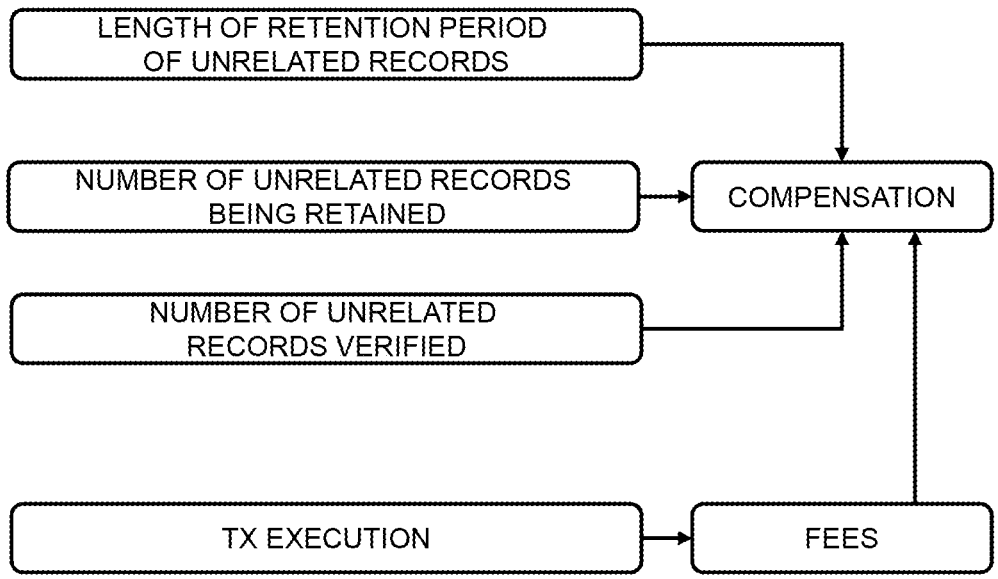
FIG. 12 is a conceptual diagram of the second embodiment of the present invention.

FIG. 12 is a conceptual diagram of the second embodiment of the present invention.

As illustrated in FIG. 11, there may be cases where the user terminal 3000 retains an unverified transaction record that is unrelated to that user. Moreover, because the transaction verification processing is performed by the user terminal 3000 that was selected according to some kind of policy, and because the transaction record that was successfully verified is broadcast to a plurality of user terminals, the user terminal 3000 needs to perform the verification processing of an unverified transaction record that is unrelated to that user, or retain a verified transaction record of a transaction that is unrelated to that user.

Thus, in this embodiment, the transaction execution program 2500 in at least one participant terminal 2000 or 3000 collects a currency amount as fees, for each execution of transaction, from the source and/or the destination for that transaction. Moreover, the transaction execution program 2500 determines the compensation (currency amount), as the distribution of the collected fees, to be provided to the participant of the participant terminal that verified or retained the transaction record. The compensation may be positive or negative. "Positive" is compensation in a narrow sense, and "negative" is compensation in a broad sense (to put it differently, for instance, a "penalty"). The compensation may be reflected in the fees. For example, a positive compensation may be the reduction of fees, and a negative compensation may be the addition of fees. That is, the determination of compensation may be included in the determination of fees. The fees may also be changed according to the level of contribution. For example, the transaction execution program 2500 may set the fees of a participant of a terminal that is often offline and not verifying other transactions to be higher than the fees of other participants. More specifically, for example, as shown in FIG. 12, the compensation to be provided to the participants may be determined based on at least one of the following. An "unrelated record" for a participant is a transaction record of a transaction that is unrelated to that participant, and may be either an unverified transaction record or a verified transaction record. Moreover, in relation to the compensation, the unit price of an unrelated record may differ depending on whether it is an unverified transaction record or a verified transaction record.

Length of period that the terminal of the participant retained the unrelated record.

Number of unrelated objects that were verified by the terminal of the participant.

Number of unrelated objects being retained by the terminal of the participant.

The foregoing explanation can be summarized, for example, as follows.

The transaction execution system comprises a plurality of transaction execution programs 2500 equipped in each of a plurality of participant terminals.

At least one participant terminal among the plurality of participant terminals stores a verified transaction table 5000 (example of verified transaction information) to which is added a verified transaction record (example of a verified transaction object), which represents a transaction and is a record that has been verified by a verifier.

Each of the plurality of participant terminals stores a unverified transaction table list 6000 (example of unverified transaction information) to which is added a unverified transaction record (example of an unverified transaction object), which represents a transaction and is a record that has not yet been verified by a verifier.

In a communication between a store terminal 3000S (example of a first participant terminal) of a store X (example of a first participant) and a personal terminal 3000P (example of a second participant terminal) of a person A (example of a second participant), the store program 2500US performs (A) and (B) below.

(A) The store program 2500US receives, from the personal program 2500UP, an unverified transaction record group as one or more unverified transaction records included in the unverified transaction table list 6000P.

(B) When the store terminal 3000S is offline, the store program 2500US respectively adds to the unverified transaction table list 6000S and the received unverified transaction record group, an unverified transaction record representing an unverified transaction between the store and the person, and sends to the personal program 2500UP the unverified transaction record group to which the unverified transaction record has been added.

When the store terminal 3000S is online, if the unverified transaction table list 6000S includes one or more unverified transaction records, the store program 2500US performs (N1) to (N3) below.

(N1) The store program 2500US requests one or more verifiers to verify at least one unverified transaction record among the one or more unverified transaction records.

(N2) The store program 2500US requests the addition to the verified transaction table 5000 of one or more verified transaction records as each of the transaction records that were successfully verified.

(N3) The store program 2500US deletes the one or more unverified transaction records corresponding respectively to the one or more verified transaction records from the unverified transaction table list 6000S.

When offline, because the verification of a transaction record is not requested to a verifier, the reliability of the unverified transaction record will be one issue. Thus, the store terminal 3000S of the store X and the personal terminal 3000P of the person A mutually retain the same unverified transaction record group including the unverified transaction record of the latest transaction that was conducted offline between the store X and the person A. The respective unverified transaction records included in the unverified transaction record group are records that are temporarily retained until being transferred to the verified transaction table 5000, and are records that will be deleted once being transferred to the verified transaction table 5000. Because the store X and the person A mutually retain the same unverified transaction record group, even if there is falsification such as the person A (example of a source) deleting the unverified transaction record without authorization, it will be possible to detect such falsification. For example, in terms of the example of FIG. 11, when the person A deletes TX2 (A, Y) without authorization and TX1 (A, X) and TX3 (A, X) are thereafter verified, and subsequently the store terminal 3000S of the store X goes online and verification processing is performed, because the verification request of TX2 (A, Y) will be made subsequent to the verification request of TX1 (A, X), it will be possible to detect falsification such as the deletion of TX2 (A, Y) without authorization. In other words, it is possible to simultaneously pursue the convenience of being able to make remittance between persons in addition to making payment offline, and the high security of being able to conduct these transactions safely.

The verified transaction table 5000 is a time sequence of the verified transaction records. The unverified transaction table list 6000 in each of the plurality of participant terminals is configured from an unverified transaction table 6210 (example of a subset) of each participant in which a transaction occurred with a participant of the corresponding participant terminal, and each unverified transaction table 6210 is a time sequence of the unverified transaction records.

When offline, because the verification of a transaction record is not requested to a verifier, the maintenance of the order of the unverified transaction records will be one issue. Thus, in addition to mutually retaining the records of transactions between participants, in each participant terminal, the unverified transaction table 6210 may guarantee the order in the same manner as the verified transaction table 5000. It is thereby possible to transfer an unverified transaction record, while maintaining the order of unverified transaction records, to a ledger in which the order of transaction records is guaranteed as with the verified transaction table 5000.

In the communication between the store terminal 3000S of the store X and the personal terminal 3000P of the person A, when the store terminal 3000S is online, the store program 2500US may execute (N1) to (N3). Accordingly, when triggered by the occurrence of a transaction, verification can be requested and ledger writing can be performed for previously accumulated unverified transaction records in addition to the record of such transaction that occurred. That is, the streamlining of the verification request and ledger write processing can be expected. Note that, even when the store terminal 3000S is offline, if the personal terminal 3000P is online, the personal program 2500UP may perform the following. Consequently, even when the store terminal 3000S is offline, so as long as the personal terminal 3000P is online, performance of the verification request and ledger writing of the unverified transaction record can be expected.

The personal program 2500UP requests one or more verifiers to verify at least one unverified transaction record in the personal terminal 3000P.

The personal program 2500UP requests the addition to the verified transaction table 5000 of one or more verified transaction records as each of the transaction records that were successfully verified.

The personal program 2500UP deletes the one or more unverified transaction record corresponding respectively to the one or more verified transaction records from the unverified transaction table list 6000P.

As described above, because the store X and the person A mutually retain the same unverified transaction record group, there may be cases where the verification of the same unverified transaction record is respectively requested regarding the store X and the person A. Thus, in this embodiment, the store program 2500US may skip the request to one or more verifiers for an unverified transaction record which has been reflected as a verified transaction record in the verified transaction table 5000. It is thereby possible to avoid redundant verification.

The store program 2500US may identify the creditworthiness of the store X and the person A based on the verified transaction table 5000S. In the communication between the store terminal 3000US of the store X and the personal terminal 3000P of the person A, even when the store terminal X is online, if the identified credit worthiness of the store X and the person A exceeds a certain level of credit worthiness, the store program 2500US may add an unverified transaction record between the store X and the person A, and refrain from requesting the verification of the unverified transaction record. When going online after a given number of unverified transaction records (for example, records related to the person A) has been accumulated, or after a given period of time has elapsed from a transaction time representing the unverified transaction object (for example, record related to the person A) at a head position in the store terminal 3000S, the store program 2500US may request verification of the unverified transaction record, and request addition to the verified transaction table 5000 of the transaction record that was successfully verified. It is thereby possible to reduce the number of online transactions and reduce the load of the store terminal 3000S.

As described above, each participant terminal may be required to retain an unverified transaction record that is unrelated to a participant of that terminal, or verify an unverified transaction that is unrelated to that participant. Thus, with each participant terminal, the consumed storage capacity or processing load may increase due to an unverified transaction record that is unrelated to a participant of that terminal. Thus, the transaction execution program 2500 in at least one participant terminal may determine the compensation to be provided to the participant of a participant terminal corresponding to at least one of the following. It is thereby possible to increase the motivation for participating in the transaction execution system.

A participant terminal retaining an unrelated unverified record, which is an unverified transaction record that is unrelated to the corresponding participant.

A participant terminal that verified the unrelated unverified record.

The compensation to be provided may be based on at least one among length of retention period of the unrelated unverified record, number of unrelated unverified records that were verified, and number of unrelated unverified records being retained. Consequently, it is expected that the determined compensation will be appropriate.

While several embodiments have been explained above, they are merely illustrative examples for explaining the present invention, and are not intended to limit the scope of the present invention to such embodiments. The present invention may also be implemented in various other modes.

What is claimed is:

1. A transaction execution system comprising a plurality of transaction execution units respectively equipped in a plurality of participant terminals, wherein:
   the plurality of participant terminals are a plurality of information processing terminals of a plurality of participants,
   at least one participant terminal among the plurality of participant terminals stores verified transaction information including a verified transaction object, which is a transaction object that has been verified by a verifier,
   each of the plurality of participant terminals stores unverified transaction information including an unverified transaction object, which is a transaction object that has not yet been verified by a verifier,
   in a communication between a first participant terminal, which is any one of the participant terminals, and a second participant terminal, which is any one of the participant terminals other than the first participant terminal, a first transaction execution unit as a transaction execution unit in the first participant terminal:
   receives, from a second transaction execution unit as a transaction execution unit in the second participant terminal, an unverified transaction object group as one or more unverified transaction objects included in the unverified transaction information in the second participant terminal;
   when the first participant terminal is offline, respectively adds an unverified transaction object representing an unverified transaction between a first participant as a participant of the first participant terminal and a second participant as a participant of the second participant terminal, to the unverified transaction information in the first participant terminal and the received unverified transaction object group, and sends the unverified transaction object group to which the unverified transaction object has been added to the second transaction execution unit,
   when the first participant terminal is online, if the unverified transaction information in the first participant terminal includes one or more unverified transaction objects, the first transaction execution unit:
   (N1) requests one or more verifiers to verify at least one unverified transaction object among the one or more unverified transaction objects;
   (N2) requests addition of one or more verified transaction objects as each of the transaction objects that were successfully verified, to the verified transaction information; and
   (N3) deletes the one or more unverified transaction objects corresponding respectively to the one or more verified transaction objects from the unverified transaction information in the first participant terminal.

2. The transaction execution system according to claim 1, wherein:
   the verified transaction information comprises a time sequence of the verified transaction objects, and
   the unverified transaction information in each of the plurality of participant terminals is configured from a subset of each participant in which a transaction occurred with a participant of the corresponding participant terminal, and each subset is a time sequence of the unverified transaction objects.

3. The transaction execution system according to claim 1, wherein: in the communication between the first participant terminal and the second participant terminal, when the first participant terminal is online, the first transaction execution unit executes (N1) to (N3).

4. The transaction execution system according to claim 3, wherein:
in the communication between the first participant terminal and the second participant terminal, when the first participant terminal is offline and the second participant terminal is online, the second transaction execution unit:
requests one or more verifiers to verify one or more unverified transaction objects;
requests addition to the verified transaction information of one or more verified transaction objects as each of the transaction objects that were successfully verified; and
deletes the one or more unverified transaction objects corresponding respectively to the one or more verified transaction objects from the unverified transaction information in the second participant terminal.

5. The transaction execution system according to claim 1, wherein:
in a case where an unverified transaction object in the unverified transaction information corresponds to a verified transaction object in the verified transaction information the first transaction execution unit skips the request to the one or more verifiers.

6. The transaction execution system according to claim 1, wherein:
the first transaction execution unit calculates a credit worthiness value for the first participant and the second participant based on first and second participant transaction history comprising the verified transaction information,
in the communication between the first participant terminal and the second participant terminal, even when the first participant terminal is online,
if the identified credit worthiness of the first participant and the second participant exceeds a certain level of credit worthiness, the first transaction execution unit adds to the unverified transaction information in the first participant terminal and the received unverified transaction object group, an unverified transaction object representing an unverified transaction between the first participant and the second participant, and does not request one or more verifiers to verify the unverified second transaction object, and
when the first participant terminal goes online after a given number of unverified second transaction objects has accumulated, or after a given period of time has elapsed from a transaction time representing the unverified second transaction object at a head position, the first transaction execution unit requests one or more verifiers to verify one or more of the accumulated unverified second transaction objects, and requests addition of one or more verified transaction objects as each of the transaction objects that were successfully verified to the verified transaction information.

7. The transaction execution system according to claim 1, wherein:
a transaction execution unit in at least one participant terminal determines a compensation to a participant of a participant terminal corresponding to at least one of the following:
a participant terminal retaining an unrelated unverified object, comprising an unverified transaction object that is unrelated to the corresponding participant, or
a participant terminal that verified an unverified object unrelated to the corresponding participant.

8. The transaction execution system according to claim 7, wherein the compensation is based on at least one among length of retention period of the unrelated unverified object, number of unrelated unverified objects that were verified, and number of unrelated unverified objects being retained.

9. A transaction execution method wherein: (A) and (B) below are performed in a communication between a first participant terminal, which is any participant terminal, and a second participant terminal, which is any participant terminal other than the first participant terminal,
wherein at least one participant terminal among a plurality of participant terminals stores verified transaction information to which is added a verified transaction object, which represents a transaction and is an object that has been verified by a verifier,
and wherein each of the plurality of participant terminals stores unverified transaction information to which is added an unverified transaction object, which represents a transaction and is an object that has not yet been verified by a verifier, the method comprising:
(A) receiving by the first participant terminal, from the second participant terminal, an unverified transaction object group as one or more unverified transaction objects included in the unverified transaction information in the second participant terminal,
(B) when the first participant terminal is offline, adding by the first participant terminal an unverified transaction object representing an unverified transaction between a first participant as a participant of the first participant terminal and a second participant as a participant of the second participant terminal, to each of the unverified transaction information in the first participant terminal and the received unverified transaction object group, and sending the unverified object group to which the unverified transaction object has been added, to the second participant terminal,
when the first participant terminal is online, if the unverified transaction information in the first participant terminal includes one or more unverified transaction objects, (N1) to (N3) below are performed:
(N1) requesting by the first participant terminal one or more verifiers to verify at least one unverified transaction object among the one or more unverified transaction objects;
(N2) requesting, by the first participant terminal, addition of one or more verified transaction objects as each of the transaction objects that were successfully verified to the verified transaction information; and
(N3) deleting by the first participant terminal the one or more unverified transaction objects corresponding respectively to the one or more verified transaction objects from the unverified transaction information in the first participant terminal.

10. A non-transitory computer readable memory storing a computer-readable program which, when executed by a processor of a first participant terminal, causes the first participant terminal, which is any information processing terminal, to: perform (A) and (B) below,
wherein at least one participant terminal among the plurality of participant terminals stores verified transaction information including a verified transaction object, which is a transaction object that has been verified by a verifier, and wherein each of the plurality of participant terminals stores unverified transaction information including an unverified transaction object, which is a transaction object that has not yet been verified by a verifier, (A) receive, from a second participant terminal, an unverified transaction object group including one or more unverified transaction objects included in unverified transaction information in the second participant terminal, (B) when the first participant terminal is offline, add an unverified transaction object representing an unverified transaction between a first participant as a participant of the first participant terminal and a second Participant as a participant of the second participant terminal to each of the unverified transaction information in the first participant terminal and the received unverified transaction object group, and send an unverified transaction object group to which the unverified transaction object has been added to the second participant terminal, when the first participant terminal is online, if the unverified transaction information in the first participant terminal includes one or more unverified transaction objects perform (N1) to (N3):

(N1) request one or more verifiers to verify at least one unverified transaction object among the one or more unverified transaction objects;

(N2) request addition of one or more verified transaction objects as each of the transaction objects that were successfully verified to the verified transaction information; and (N3) delete the one or more unverified transaction objects corresponding respectively to the one or more verified transaction objects from the unverified transaction information in the first participant terminal.

* * * * *